UNITED STATES PATENT OFFICE.

HEINRICH THIEMANN, OF STOLP, GERMANY.

PROCESS OF UTILIZING WASTE AMBER.

No. 839,336.

Specification of Letters Patent.

Patented Dec. 25, 1906.

Application filed June 17, 1905. Serial No. 265,699.

*To all whom it may concern:*

Be it known that I, HEINRICH THIEMANN, a subject of the Duke of Anhalt, residing at 17 Kirchplatz, Stolp, Pomerania, in the Kingdom of Prussia and Empire of Germany, have invented a new and useful Improved Process of Utilizing Waste Amber, of which the following is a specification.

My invention relates to an improved process of utilizing waste amber.

A substitute for amber has already been made by preliminarily treating waste amber with solvents, then pressing the same while applying heat, and adding it to natural amber or also to copals. The product obtained in this manner, however, owing to the impurities contained in the waste, was suitable only for the manufacture of inferior products, mostly dark amber-varnish.

The process forming the subject of my said invention is designed to so improve inferior brittle amber and waste amber or other cheap resins, such as copal, which are not by themselves suitable as a substitute for amber that they will form a substitute for valuable and expensive amber. For this purpose I employ instead of the crude waste amber the ingredients of the same which are soluble in chloroform, ($\alpha$ and $\beta$ resin.)

On treatment of the crude waste in the well-known manner with chloroform the soft $\alpha$ and $\beta$ resins are obtained free from impurities. This mixture of $\alpha\beta$ resin is added to the brittle sorts of amber or also to other resins, especially copal, which thereby have such a density, strength, and pliancy imparted to them that they may replace amber of good quality, but are considerably cheaper than the latter.

The compound obtained by my process is designed to be molded to form articles of various kinds, such as cigar-holders, ornaments, and the like.

In carrying this process into practice I pulverize waste amber and repeatedly subject the same to the action of warm chloroform or also ether. The solution obtained in this manner is subjected to distillation, thereby producing a yellowish-white mixture of resin, the $\alpha\beta$ resin of amber. By heating this mixture it is freed from the last traces of the solvent, and after allowing the mixture to become quite cool it is ground. To the pure $\alpha\beta$ resin-dust thus produced I add succinic acid. By this means I achieve not only an increased strength, but also a more natural appearance, the product exhibiting a milky and cloudy appearance peculiar to natural amber.

As a rule I add from ten to thirty grams of succinic acid to one kilogram of $\alpha\beta$ resin-dust.

For improving copal I work twenty-five grams of the mixture of $\alpha\beta$ resin-dust and succinic acid with one thousand grams of pulverized copal to form a fine dust, this dust being introduced into the heating-chambers of a hydraulic press and compressed under great pressure after heating. During the pressing of the heated mixture an irregular distribution of the acid within the mixture takes place, which gives the product a striped cloudy appearance. After the cooling a homogeneous product is obtained which may be worked like wood, horn, amber, and other similar natural products and is particularly adapted for the manufacture of ambroid.

In case brittle amber is to be improved I use for one thousand grams of amber-dust from ten to fifty grams of the mixture of $\alpha\beta$ resin-dust and succinic acid, according to the hardness of the amber, less being added to softer amber and more to harder amber.

The purified mixture of $\alpha\beta$ resin is very well suited for the preparation of the valuable light amber-varnish, while the $\gamma$ resin purified by fusion gives a considerably harder varnish than may otherwise be obtained directly from amber.

To seventy-five parts of amber $\gamma$ resin I add fifty-five parts of linseed-oil varnish and eighty parts of turpentine-oil.

What I claim as my invention, and desire to secure by Letters Patent, is—

1. A process of utilizing waste amber, consisting in intimately mixing the mixture of $\alpha$ and $\beta$ resin obtained in the known manner from waste amber with succinic acid, and adding this mixture to other resins, for the purpose of so improving the same that they form a substitute for expensive amber.

2. A process of utilizing waste amber, consisting in intimately mixing the mixture of $\alpha$ and $\beta$ resin obtained in the known manner from waste amber with succinic acid, and adding this mixture to copal, for the purpose of so improving the same that it forms a substitute for expensive amber.

3. A process of utilizing waste amber, consisting in extracting $\alpha$ and $\beta$ resin by means of a solvent, evaporating the solvent, allowing said resin to harden, powdering the same and mixing with succinic acid.

4. A process of utilizing waste amber, consisting in separating α and β resin therefrom, allowing the separated material to harden, powdering it and mixing succinic acid with the powder.

In testimony whereof I have signed my name to this specification in the presence of two subscribing witnesses.

HEINRICH THIEMANN.

Witnesses:
 EÜGEN FISCHER,
 OTTO DICK.